(12) United States Patent
Mathieu

(10) Patent No.: US 6,369,718 B1
(45) Date of Patent: Apr. 9, 2002

(54) OIL WELL MONITORING AND CONTROL SYSTEM COMMUNICATION NETWORK

(75) Inventor: Yves M. Mathieu, Les Ulis (FR)

(73) Assignee: Schlumberger Technology Corporation, Houston, TX (US)

(*) Notice: Subject to any disclaimer, the term of this patent is extended or adjusted under 35 U.S.C. 154(b) by 0 days.

(21) Appl. No.: 09/311,010

(22) Filed: May 13, 1999

(30) Foreign Application Priority Data

May 22, 1998 (GB) .............................................. 9810940

(51) Int. Cl.$^7$ ................................................ G01V 3/00
(52) U.S. Cl. .............................. 340/853.7; 340/853.3; 340/854.9; 340/310.01; 455/3.3; 333/100
(58) Field of Search ........................... 340/853.3, 853.7, 340/854.9, 855.8, 310.01, 310.05; 455/3.1, 3.3; 333/100, 124

(56) References Cited

U.S. PATENT DOCUMENTS 4,017,845 A * 4/1977 Killian et al. .......... 340/310.05
5,257,006 A * 10/1993 Graham et al. ........ 340/310.01

FOREIGN PATENT DOCUMENTS

| GB | 2 188 818 | 10/1987 |
| WO | WO 92/17968 | 10/1992 |

* cited by examiner

*Primary Examiner*—Timothy Edwards
(74) *Attorney, Agent, or Firm*—John J. Ryberg; Brigitte L. Jeffery

(57) ABSTRACT

A method and apparatus for implementing a communication network for well monitoring and control applications where a twisted pair cable bus is used to connect well-related locations. The twisted pair cable bus will exhibit high parallel impedance when used in differential mode and low series impedance in common mode. A bus supervisor and devices connected at nodes can exchange signal transmission. Communication, including data and control, signals and power signals can circulate along the twisted pair cable bus among and between the connected devices.

27 Claims, 10 Drawing Sheets

OIL WELL MONITORING AND CONTROL SYSTEM COMMUNICATION NETWORK

BACKGROUND OF THE INVENTION

1. Technical Field

This invention relates generally to oil well instrumentation and controls and more particularly to communication networks in well monitoring and control systems implemented over a communications bus.

2. Related Background Art

Permanent monitoring systems, as shown in FIG. 1, are used to equip subterranean wells with downhole sensors and devices, enabling the well operator to monitor and control downhole conditions in a completed well.

Generally, permanent monitoring systems are found in oil or gas wells, but can also be used in water or geothermal wells. After drilling is complete, the borehole is typically cased with casing 2 and cemented (cement annulus 3) along its entire length in formation 4, and closed by wellhead 5. Typically, the casing 2 has perforations P at an oil producing zone 6 to allow the oil to enter the cased well for production Well "completion" includes the installation within the cased well 1 (With direction of production flow indicated by the arrow) of production tubulars (or tubing) 18 and downhole devices including packers 10, valves 11, other devices 12 and sensors 25 necessary to bring the production safely and efficiently to surface. Completion equipment typically remains installed in the well for the duration of production.

Downhole sensor 25 for measuring, for example pressure, temperature, flow, resistivity or other physical parameters, is commonly attached to the tubing 18 at selected locations.

Advanced permanent monitoring and control systems, especially useful where several zones traversed by the well are producing (as occurs, for example, in horizontal or multilateral wells) typically employ downhole sensors and actuators, controllable from the surface, to improve production efficiency of the well.

In these installations, downhole devices including, for example (with reference to FIG. 1), packer 10, valve 11, other device 12 and sensor 25, are electrically connected through cable 20 to a data acquisition device 15 usually located at the surface. The cable is permanently installed along with the tubing during well completion.

Permanent cable 20 is secured by clamps 30 to the tubing 18 and lowered into the well with the tubing. Cable 20 is used both to provide necessary electrical power to the sensors and to carry the measurement information as an electrical signal, in analog or digital form, to the data acquisition device at the surface.

In present permanent monitoring systems, permanent cable 20 is typically implemented as an encapsulated mono-wire cable 20 consisting of insulated copper mono-wire 22 housed within a stranded (conductive) armor 24. This configuration, however, because of the harsh downhole environment, has proven difficult to maintain in an efficiently operable state for long periods of time due to degradation, the biggest problem being loss of the cable's watertight characteristics.

As illustrated in FIG. 2, conductive metal clad cable 20', comprising the insulated copper mono-conductor 22 housed in conductive metal clad armor 24', is now preferred to stranded armor cable for its advantages in maintaining watertight operation for longer periods of time.

The mono-wire 22 of metal clad cable 24' currently in use is typically an AWG#18, 7 strand copper mono-conductor with double layer insulation, having a DC resistance of 23 $\Omega$/km. The metal clad armor 24' is typically stainless steel tubing having an outside diameter of 6.35 mm and a DC resistance of 9 $\Omega$/km.

A typical application of such cable is illustrated in FIG. 3 where, as cable 20' is mono-conductor, the electrical circuit between a downhole device such as sensor 25 and the surface device 15 is closed by the (conductive) metal clad armor 24' of the cable.

Limitations of mono-conductor cable in permanent cable applications restrict the effectiveness and utility of the current level of advancement achieved in the area of permanent monitoring systems.

For example, mono-conductor cable is not especially well adapted to use as a transmission line as the electrical parameters are not well defined and are dependent on the tubing, limiting the useful frequency bandwidth and data rate of transmission.

The mono-conductor cable can only support DC or AC power from surface to downhole to supply downhole sensors with power, and communication signals, one-way or two-way, between surface and downhole. These signals are not "floating" as they are tied to ground by the tube and tubing return path. No additional power can be sent, for example, to operate downhole actuators.

The armor (and tubing) return path in the mono-conductor cable can also be used by currents from other devices, like another sensor and its cable installed in the same well or a downhole electric motor powered from the surface through a power cable to operate a downhole pump. In such cases, unwanted signals will likely be added to the system signals and will appear as noise. Also, as the conductor and the return path are physically separated, electromagnetic signals could be induced in this circuit loop, increasing the noise level of the communication link and disturbing the wanted signal readability.

The advantages of twisted pair lines in lieu of single conductor lines in traditional communications applications are well known and have been applied to some degree in the petroleum industry.

For example, U.S. Pat. No. 5,444,184 to Hassel utilizes at least two twisted pairs for above surface communications between land and offshore installations. Hassel discusses the addition of signal communication paths to a power transmission cable by replacing each power conductor with a twisted pair wire. In one embodiment, 3 signal communication paths are added to a 3 phase power cable by replacing each phase conductor by a twisted pair. In another embodiment, 2 signal communication paths are added to a 2 conductor monophase power cable by replacing each conductor by a twisted pair.

The cable of Hassel is not proposed for downhole installation inside a well, but for placement on the sea floor to link the shore and the well head. Differential connections are utilized for both communication and power transmission. Hassel is neither intended as a subsurface transmission line (i.e., for downhole well applications) and exploits the long known advantageous characteristics of utilizing twisted pairs lines in communications applications.

Another example of the application of twisted pair lines in petroleum industry applications is found in U.S. Pat. No. 4,646,083 to Woods which discusses use of a twisted pair line to transmit DC power and analog signals (frequency) in downhole applications. DC power and two AC communication signals are multiplexed on the 2 wires of a twisted pair using a differential mode (i.e., the current is sent via the first wire and returns via the second). The multiplexing element is a transformer associated with a DC current balance circuit to avoid saturating the magnetic core of the transformer buy the transmitted DC power current.

SUMMARY OF THE INVENTION

Limitations of the prior art are overcome by the method and apparatus of the present invention of an oil well monitoring and control system communication network as described herein.

In various embodiments of the apparatus and method of the present invention for transmission of electrical signals, including both electrical power and communication signals, between a plurality of locations in a well, a bus supervisor is located at one of the plurality of locations with a node located at each of the remaining locations of the plurality of locations.

A bus interface at the bus supervisor and each node is capable of supporting differential and common mode connection between the bus supervisor and each node, and between the nodes themselves. The interface provides high parallel impedance for differential mode connections and low series impedance for common mode connections.

A bus electrically connects the bus supervisor and each node via the respective bus interfaces in common mode with an electrical return path to the bus supervisor for transmitting electrical power signals to or between each node location, and in differential mode for two way transmission of communication signals between the bus supervisor and nodes or between the nodes.

In alternative exemplary embodiments, the bus interface can be coupled to either a differential receiver and a coil, a differential transmitter and a coil, or it can provide galvanic insulative properties such as when implemented as a transformer.

The bus can comprise a cable comprising a pair of electrical conductors and an external armored shell housing the conductor pair. The armored shell can also be conductive and be used as the common mode electrical return path.

In a preferred embodiment, the bus is implemented as a twisted pair cable.

Communication, including data and control, signals and power, including both AC and DC, signals power can be transmitted. The bus supervisor may be located at either a surface or downhole location.

The present invention can also be adapted to multi-node and industrial bus extension applications.

Advances in the art are achieved by accommodating both power and communication applications where digital signal transmission is accomplished in differential mode, and DC or AC power transmission in common mode with return, in a preferred embodiment, via a twisted pair cable communication bus. The transformers in the various embodiments are not subject to saturation as in known implementations as the power current is automatically balanced into the two transformer primary windings. No current balancing circuit is necessary and a single twisted pair suffices for both power and communication signal transmission.

The foregoing and other features and advantages of the present invention will become more apparent in light of the following detailed description of exemplary embodiments thereof, as illustrated in the accompanying drawings.

BRIEF DESCRIPTION OF DRAWINGS

The following drawings are referenced in the detailed description which follows and are provided to facilitate a better understanding of the invention disclosed herein.

DETAILED DESCRIPTION OF THE PREFERRED EMBODIMENTS

In permanent monitoring and control installations and applications, it is often desirable to transmit signals between various devices useful in monitoring and controlling a well. These signals can be generalized as falling into either one of two categories: communication signals and power signals.

Figure 1:
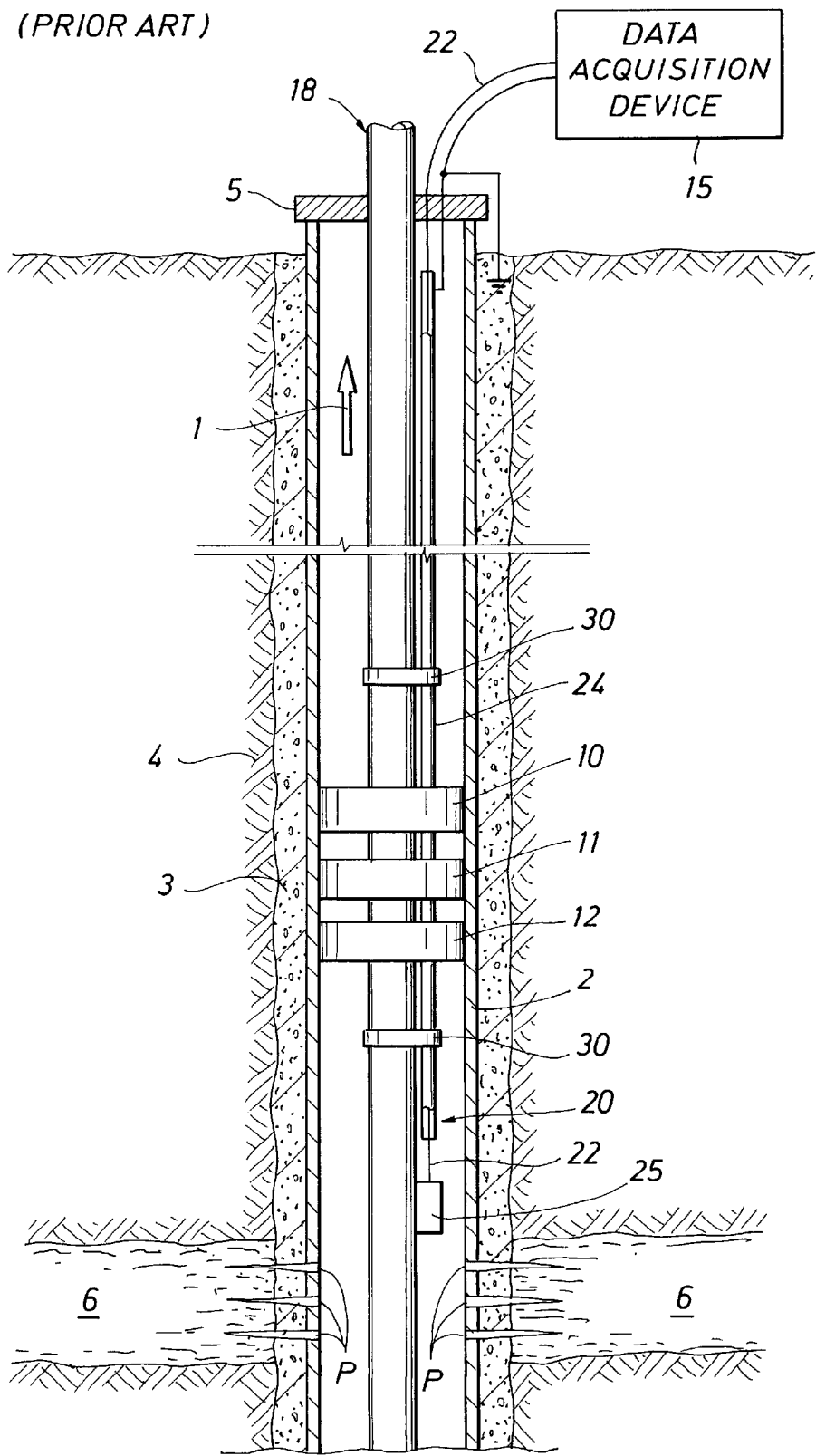
FIG. 1 illustrates a typical known permanent sensor installation for an oil well.
Figure 2:
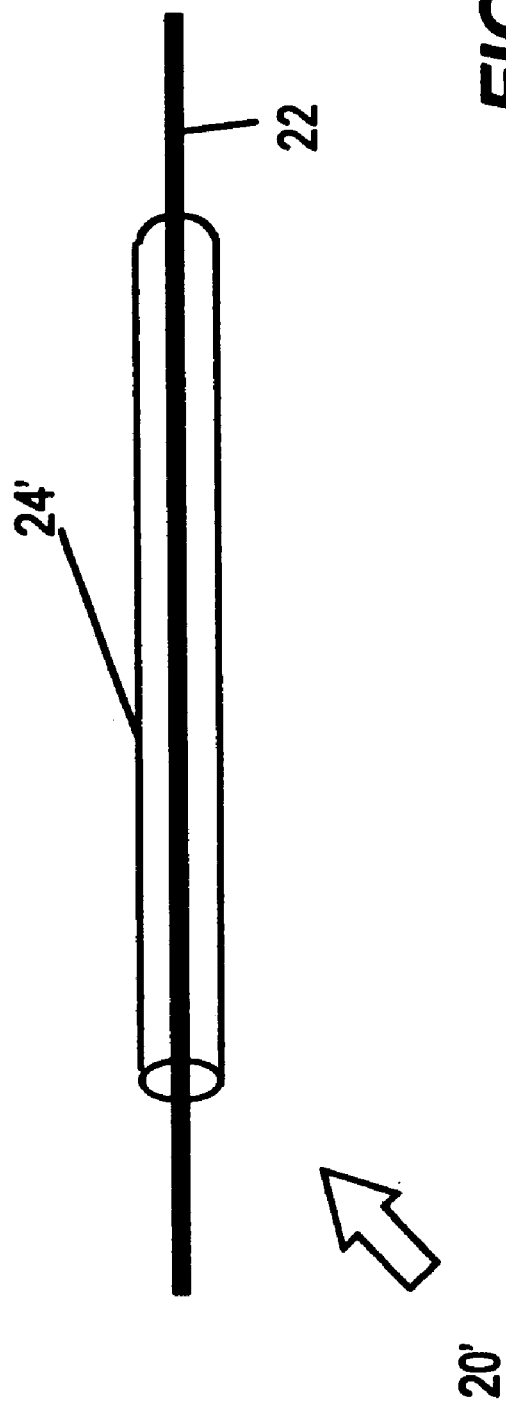
FIG. 2 illustrates a typical known encapsulated metal clad mono-wire cable.
Figure 3:
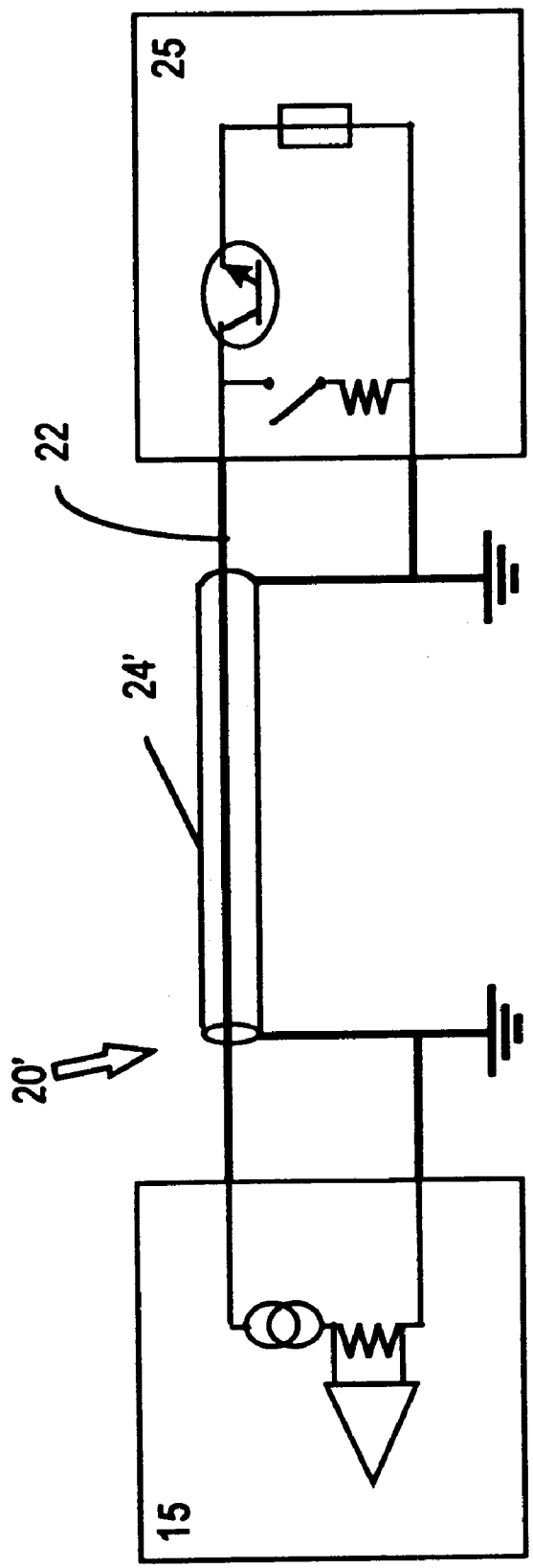
FIG. 3 illustrates the electrical principle of operation of known mono-wire cable installations.
Figure 4B:
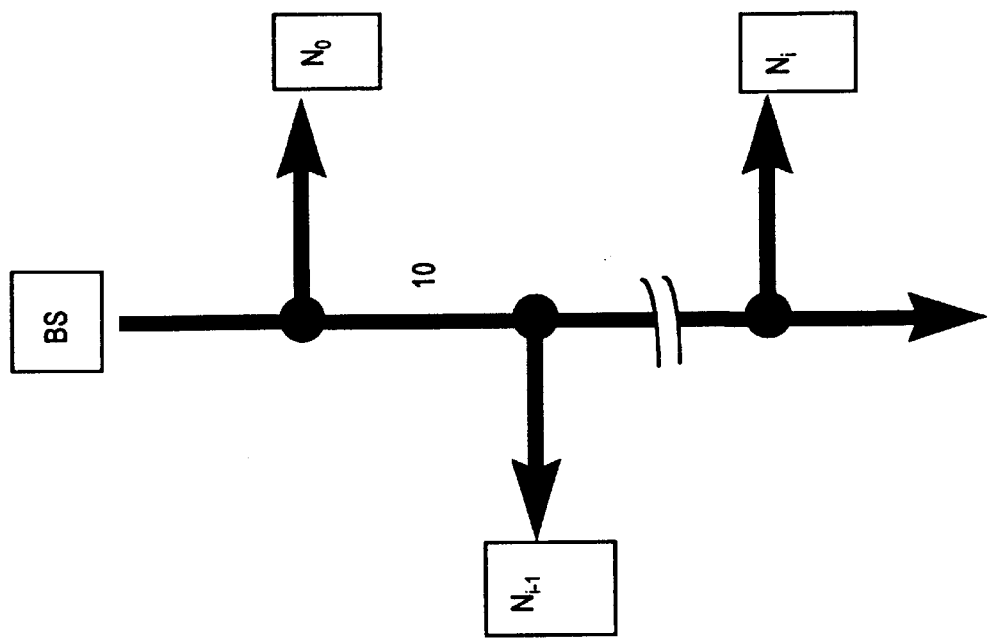
FIG. 4b illustrates power signal flow of the present invention.
Figure 4A:
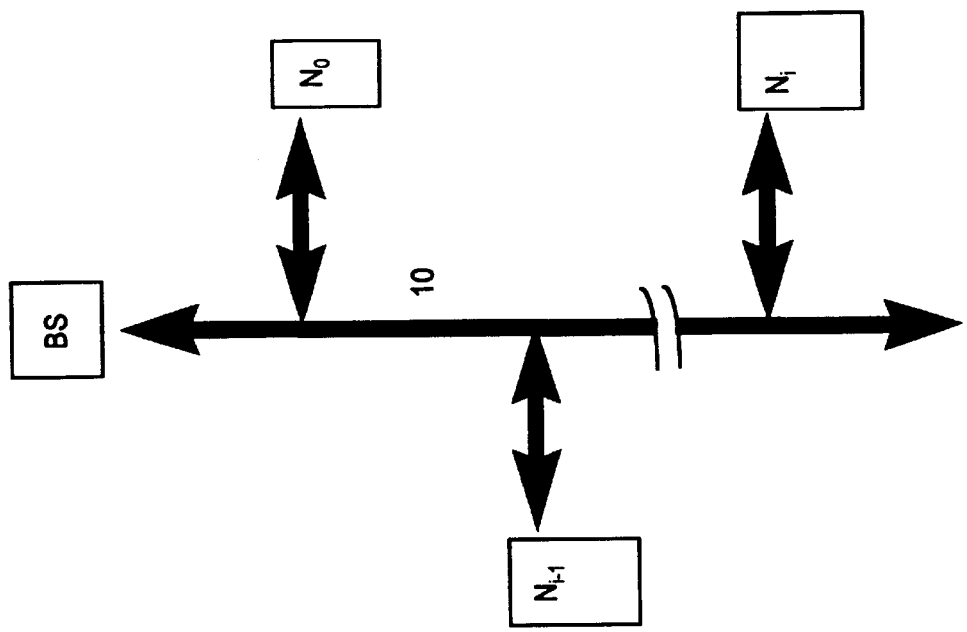
FIG. 4a illustrates communication signal flow of the present invention.

Communication signals include control and/or data signals which require two-way transmission capability as illustrated in FIG. 4a. Power signals, including DC or AC power, are supplied to downhole devices in need of external power. Power transmission is thus effected as a one-way transmission capability as shown in FIG. 4b.

Figure 5:
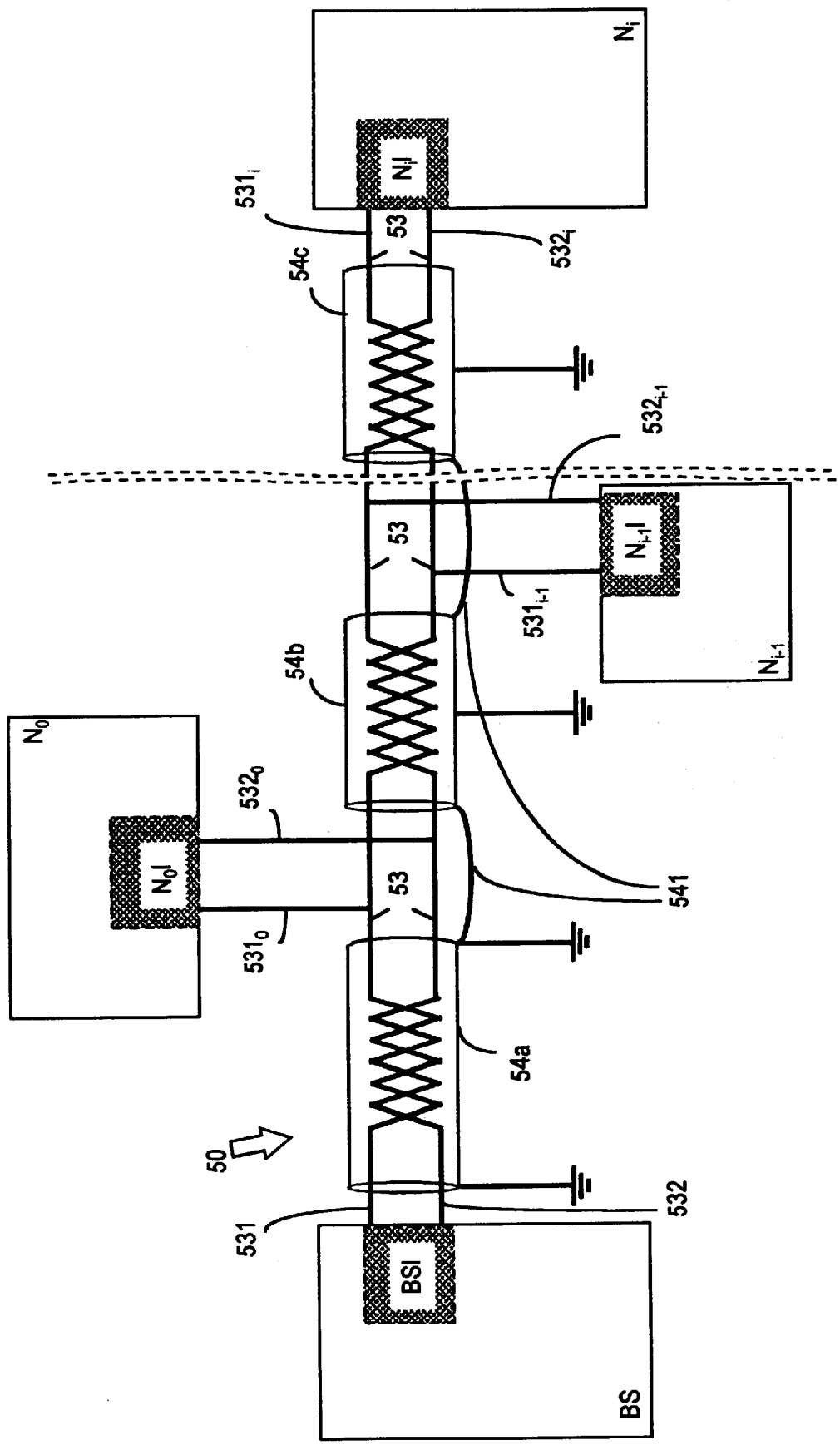
FIG. 5 illustrates the network implementation of the present invention.

FIG. 5 illustrates a well communication network implementation according to the present invention which is capable of supporting such power and communication transmission.

In this illustrative embodiment, a metal clad twisted pair cable 50 is provided as a bus (10 FIGS. 4a and 4b) for communication between devices at bus supervisor BS and those at nodes $N_0$ through $N_i$ (where, while only 3 nodes are shown for illustrative purposes, i can be any integer>0). Cable 50, i.e., the bus, comprises a stainless steel tube 54 (with optional outer encapsulation not shown) and a twisted insulated conductor pair 53 ("twisted pair", individual conductors 531 and 532 respectively) housed within the tube 54. In this embodiment, the tubing is illustratively segmented into individual sections 54a, 54b and 54c to accommodate breakout for connecting to the individual nodes along feeds $531_0$, $531_{i-1}$, $531_i$, and $532_0$, $532_{i-1}$, $532_i$. The individual tube sections 54a, 54b and 54c are electrically connected via shunts 541 to provide an apparent electrically continuous tube. An unsegmented continuous tube with alternative breakout provision may also be devised.

Bus supervisor BS is connected to bus 50 via bus supervisor interface BSI Each node $N_i$ is connected to bus 50 via node interface $N_i$I.

As illustrated in FIGS. 4a and 4b, both communication and power signals may be transmitted by and between the various devices connected to the bus. The embodiment of FIG. 5 supports two way transmission of communication signals including data and control signals (as shown in FIG. 4a) and one way power signal transmission sourced at the bus supervisor for transmission to the individual connected nodes (as shown in FIG. 4b). (Although not shown, two-way power transmission is also possible as will be discussed with respect to FIG. 6.)

In order to support these signal transmission capabilities, the bus characteristics are designed so as to allow common mode and differential mode connection between the bus supervisor and nodes and between the nodes themselves. According to the present invention, the bus interface will exhibit the characteristic of low series impedance when connected in common mode and high parallel impedance when connected in differential mode.

In this embodiment, the devices at each node are addressable allowing data and/or control signals to be sent to and/or received from individually identifiable devices. For addressing capabilities, the bus supervisor and nodes are equipped with (complementary) addressable circuitry as will be understood by one of skill in the art.

Power signals, in this embodiment, are sent in common to all nodes.

The devices located at the nodes will be in a "listen" state when not "busy" performing commanded action or receiving or transmitting data. In the listen state, the individual nodes will "listen" to all bus traffic (regardless of the origin of any signal, i.e., whether the signal originates at the BS or at other nodes) looking for communications specifically addressed to them, ignoring those signals bearing other addresses.

Common response operation is also possible with one (command) signal bearing a universal address or universal identifier to which all connected devices may respond.

A protocol can be implemented giving the supervisor BS prioritized status for all BS originated communications.

In one configuration the bus supervisor BS is located at surface with the nodes located downhole. In an alternative configuration, both the supervisor BS and nodes can be located downhole. However, any combination of surface and downhole locations may be devised and are envisioned to fall within the scope of this invention.

Figure 6:
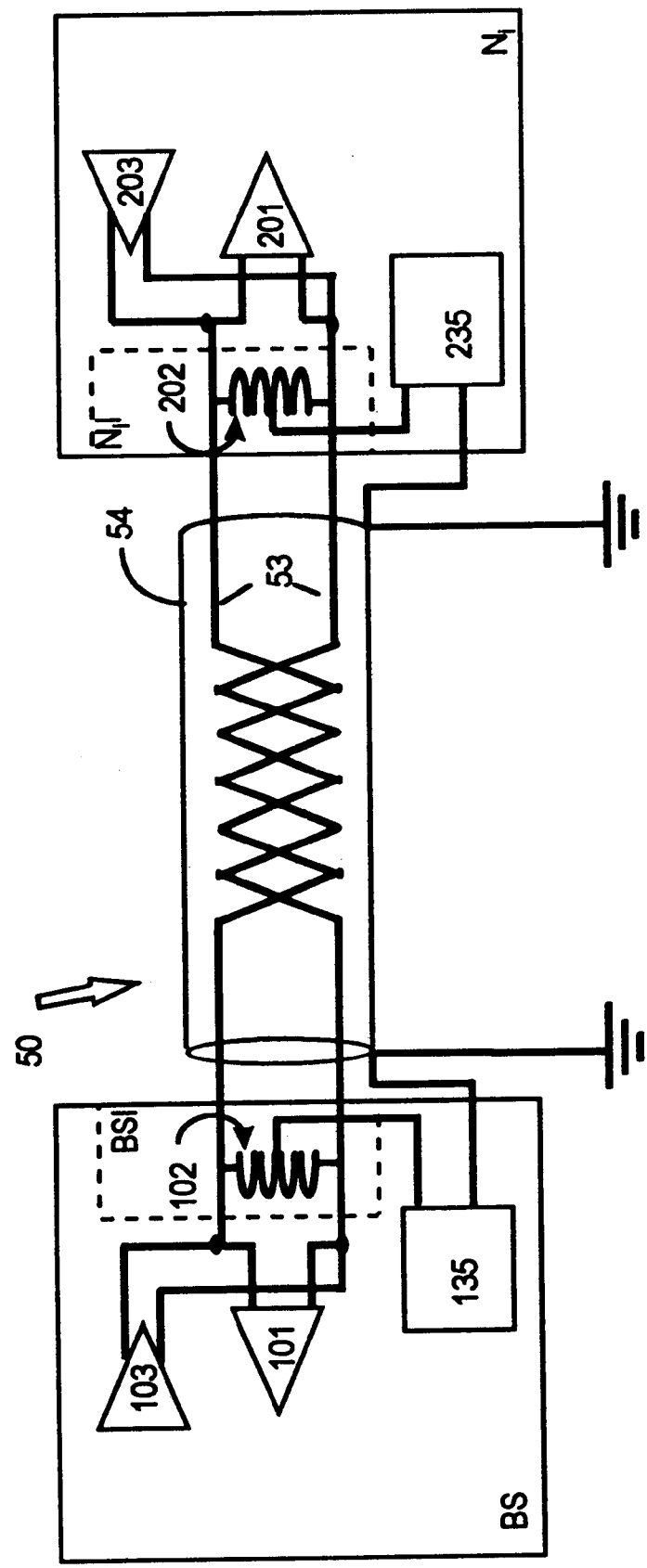
FIG. 6 illustrates one embodiment of the network of the present invention.

For illustrative purposes, a well communication network implementation according to the present invention is shown in FIG. 6. While for simplicity of explanation only one node $N_i$ is shown, the principles of operation of the single node configuration are equally extendible to multi-node configurations as shown in FIG. 5 and as will be discussed with reference to FIG. 8.

Bus supervisor BS, with power source 135, is connected to bus 50 via bus supervisor interface BSI. Node $N_i$ is connected to bus 50 via node interface $N_iI$.

In this illustrative embodiment, the bus interface BSI is implemented as a coil 102 having a center tap. The bus supervisor BS is equipped with differential receiver 101 and a differential transmitter 103 coupled across the coil outputs. Node interface $N_iI$ is similarly implemented as a coil 202 having a center tap. Node $N_i$ is equipped with a device requiring power 235 (such as an actuator), a differential receiver 201 and a differential transmitter 203 coupled across the coil outputs. Communication and power signal transmission according to the present invention are thus possible.

Bus supervisor BS and node $N_i$ are connected in common, or "phantom" mode for the downhole transmission of power (AC or DC). In common mode, power source 135 of bus supervisor BS is connected to the center tap of coil 102 with an electrical return path via bus armor 54, which is connected to system ground (usually earth ground in well applications). Node $N_i$ is likewise connected in complementary fashion to complete the common mode connection. Device 235, located at node $N_i$, is connected to bus armor 54 and to the center tap of coil 202. Downhole device 235 receives power transmission from DC (or AC) supply 135 over the twisted pair 53 in "phantom" mode with return by armor 54. In phantom mode, both wires 531, 532 of the twisted pair 53 are electrically connected in parallel, with return by the cable armor 54.

Although in this embodiment power transmission is from supervisor BS to node $N_i$, it will be understood by one skilled in the art that the system of the present invention is a symmetrical system through which power could also be sent from node $N_i$ to another device at another node for example.

Bus supervisor BS and node $N_i$ are connected in differential mode for the (two-way) transmission of communication (data and control) signals. In differential mode, differential receiver 101 and differential transmitter 103 of bus supervisor BS are connected to the conductors of twisted pair 53 of bus 50. Node $N_i$ is likewise connected in complementary fashion to complete the differential mode connection.

The network implemented in this fashion will exhibit the desired characteristics set forth above of high parallel impedance in differential mode and low series impedance in common mode.

Design criteria may dictate, for example, in circumstances dependent upon the types of devices installed or where the bus will run over great distances, or where there is concern that a current loop may be formed through the system electronics, that galvanic insulation be used to protect the system electronics.

Figure 7:
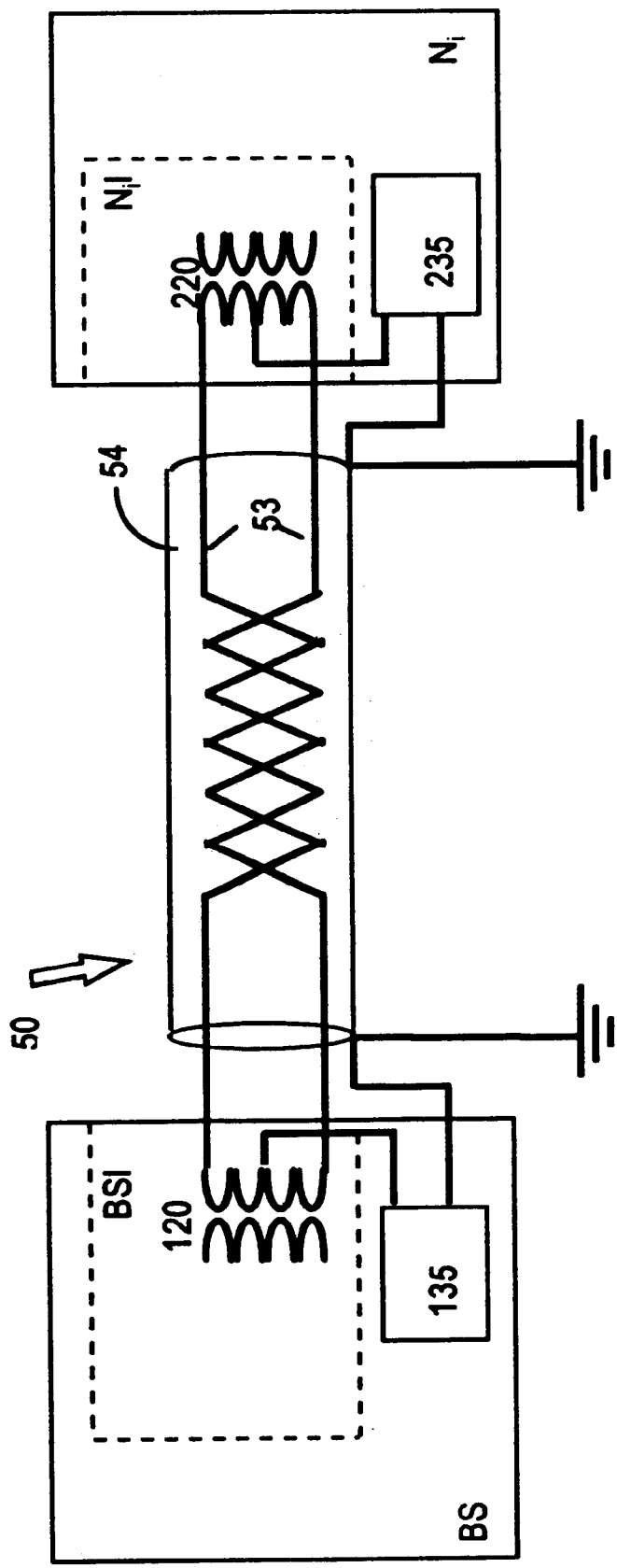
FIG. 7 illustrates an alternative embodiment of the present invention where galvanic insulative properties are incorporated into the network.

FIG. 7 illustrates such an embodiment of the present invention where galvanic insulation is incorporated.

In lieu of the bus interfaces as implemented in the embodiment of FIG. 6, the bus interfaces for both the bus supervisor BSI and for the node $N_i$ are implemented as transformers 120 and 220 respectively. The bus supervisor and device at node $N_i$ are thus insulated from undesired current loops or noise interference, as will be understood by those skilled in the art.

Alternative combinations of the various types of interfaces described in the foregoing embodiments are possible depending on system needs as will be understood by one skilled in the art.

Figure 8:
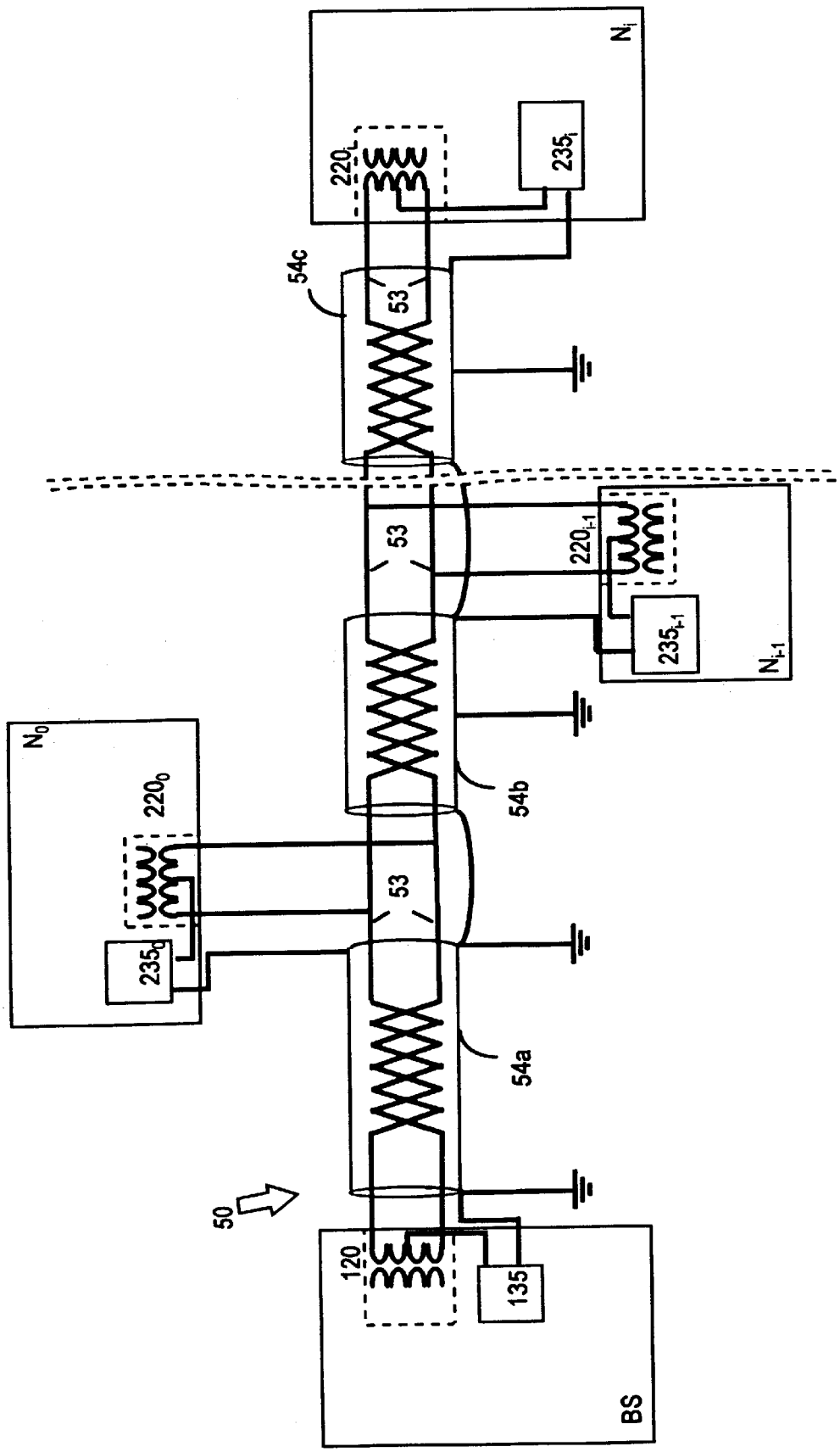
FIG. 8 illustrates the embodiment of FIG. 7 extended to multiple nodes.

The embodiment of FIG. 8 is an example of the network of the present invention deployed in permanent monitoring and control applications.

In FIG. 8, as referenced above, the present invention is implemented in a multi-node network with galvanic insulation protection. This embodiment illustrates many of the advantageous features of the present invention including galvanic insulation and multi-device capability. As mentioned previously, while in one embodiment the bus supervisor is located at the surface and all nodes downhole, an alternative embodiment can be devised, for example, where all locations are downhole—i.e., the bus supervisor as well as all nodes are downhole.

An AC or DC power path from supply 135 is required to supply power to operate downhole actuators $235_0$–through $235_i$. Phantom mode of the present invention is used to provide this power path. In addition to a power signals for powering downhole devices, other communication signals including sensor data signals and control signals from surface to downhole devices are multiplexed over the twisted pair, using known multiplexing techniques.

Several advantages of the twisted pair cable bus of the present invention will be evident.

As the bus supervisor-node (eg., surface receiver/downhole sensor) communication circuit does not use the cable tube nor the completion tubing as the return path, crosstalk from other sensors and noise from electrical pumping equipment installed in the same well are avoided. The circuit is floating with respect to ground, allowing differential voltage techniques (differential transmitter, differential receiver) to be used to attain improved noise rejection.

As mentioned previously, galvanic insulation between surface and downhole equipment serves to limit noise interference and prevent a current loop through electronics connected on the bus. Whether galvanic insulation is required will depend on design criteria established in consideration of such factors as the length of the bus and the types of devices connected on the bus.

In addition to downhole sensor power supply current, power in the form of both DC or AC current can be sent to downhole actuators, using the twisted pair 53 in phantom, i.e., both pair wires 531, 532 electrically connected in parallel with return by cable armor 54. For power transmission, this phantom mode is not sensitive to possible induced noise.

Because of the well defined characteristic impedance of the twisted pair of the present invention, its full bandwidth can be exploited for data transmission.

Additionally, the influence of perturbing electromagnetic fields is strongly limited by the twist of the two wires 531, 532 of twisted pair 53, as one circuit loop is compensated for by the following loop. Perturbations will be induced in common mode, i.e., identically on both wires at the same time, and the voltage difference between the two twisted pair wires will not be disturbed.

Figure 9:
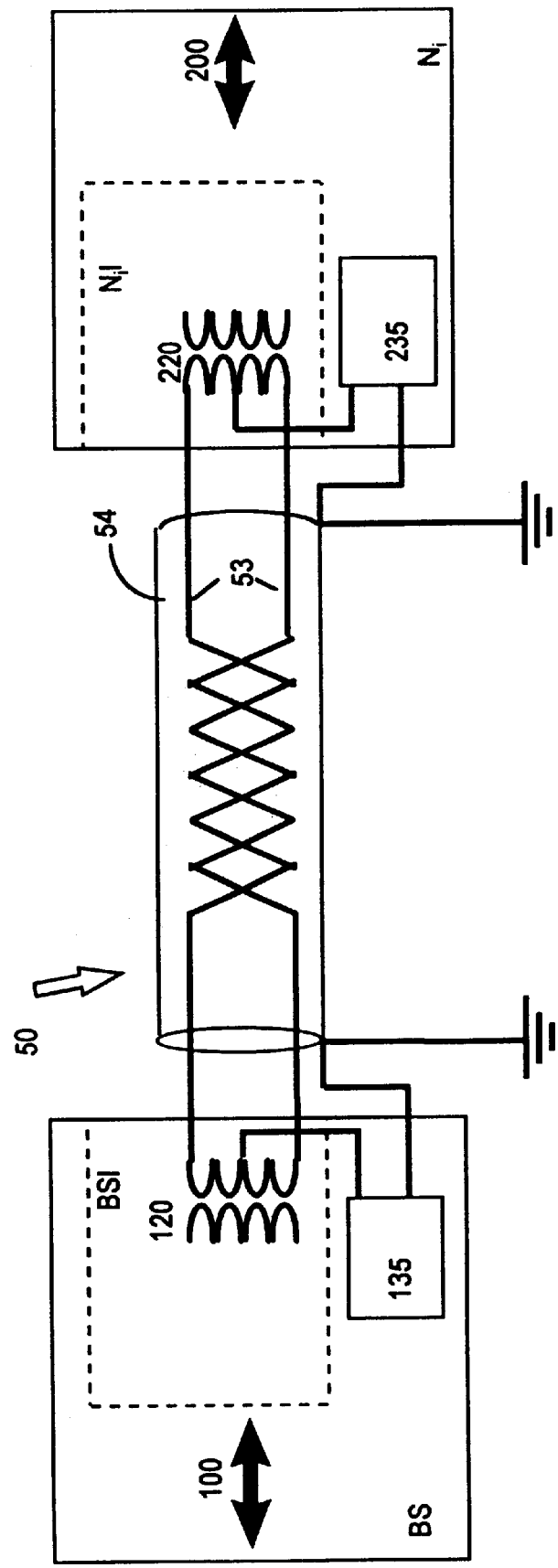
FIG. 9 illustrates the network of the present invention deployed as an industrial bus extension.

As illustratively shown in the alternative embodiment of FIG. 9, the present invention can be deployed as a downhole extension of an industrial bus. A majority of commercially available industrial buses used in factory automation and industrial control systems (for example, Profibus, Interbus, DeviceNet, Fieldbus Foundation, WorldFIP) support a twisted pair bus as the physical interconnection layer. The industrial bus is essentially a surface control and data acquisition system. Cable 50 of the present invention is used to extend this type of bus into the wellbore to connect downhole devices compliant with the bus protocol. Surface industrial bus 100 and downhole industrial bus 200 can thus be extended via the network implemented according to the present invention.

One distinct advantage of this architecture is that dedicated acquisition systems for the downhole sensors can be avoided. Available commercial bus controllers and their software can be used.

Figure 10:
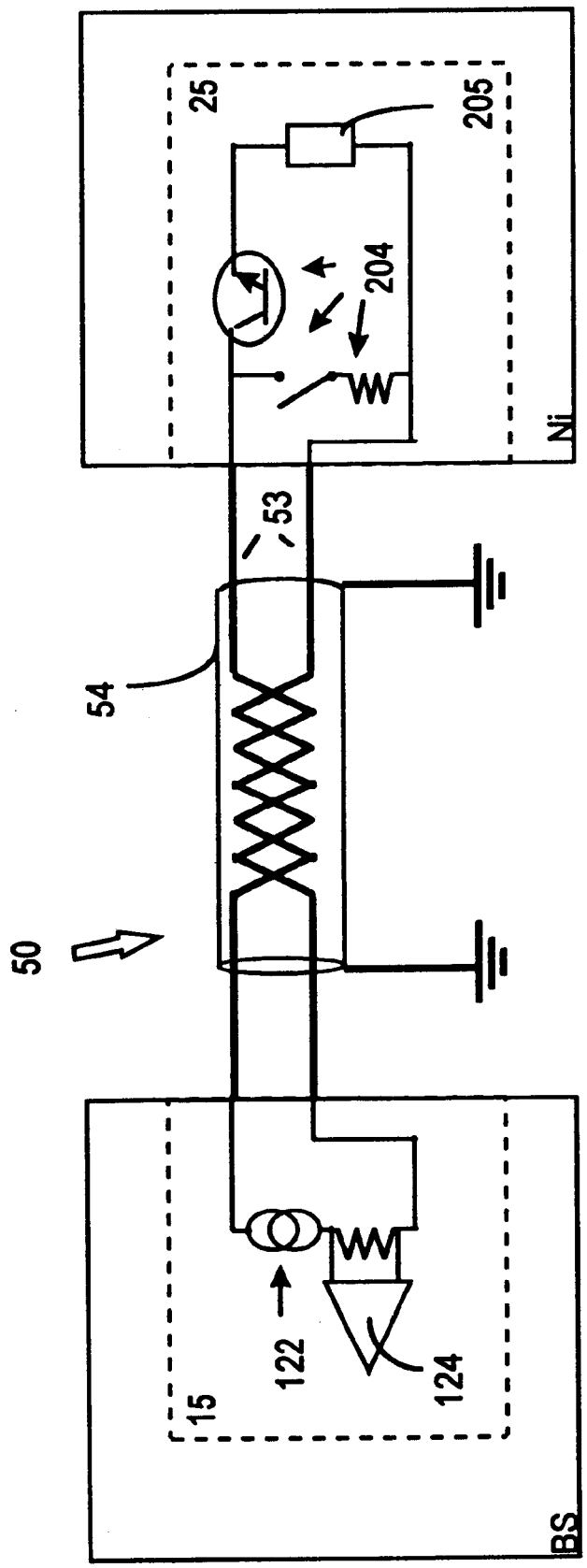
FIG. 10 illustrates implementation of the present invention with conventional surface and downhole equipment.

FIG. 10 shows an illustrative embodiment of the present invention useful in permanent monitoring installations with currently used equipment. Surface device 15, the bus supervisor, is connected to bus 50 via a differential connection. Downhole sensor 25 at node $N_i$ is connected to bus 50 via a differential connection as well. Bus armor 54 is earth ground. Sensor 25 comprises signal transmitter 204 and sensor electronics 205. Device 15 comprises dc power supply 122 and signal receiver 124. Sensor 25 is powered from device 15 through bus 50 and transmits data to device 15 through via bus 50. Stainless steel tube 54 is connected to earth ground as shown.

Advantages of the illustrative embodiment of FIG. 10 over current implementations include improved noise immunity to eventual parasitic currents in the tubing and electromagnetic perturbing fields. Sensor 25 can still be grounded downhole (often, admissible voltage between sensing element and sensor case is to be limited or null for the sensor to operate with its full accuracy) without penalty. At surface, the receiver 124 (and eventually the downhole sensor power supply) remains floating or differential.

As seen, in the foregoing illustrative embodiments, bus 50 has been implemented as a twisted pair armored cable. In these embodiments, the stainless steel tube or armor 54 of cable 50 was chosen to have an outside diameter of 6.35 mm, a 9 Ω/km DC resistance and a characteristic impedance of 95Ω. The conductors 531, 532 of twisted pair 53 were chosen to be each AWG#20, 7 strand, tinned copper conductors, each with double layer insulation and each presenting a 34 Ω/km DC resistance. These characteristics are merely illustrative based on a particular set of design criteria. Variations forming any adequate combination for the intended use can be employed as will be understood by those skilled in the art.

The present invention has been illustrated and described with respect to specific embodiments thereof. It is to be understood, however, that the above-described embodiments are merely illustrative of the principles of the invention and are not intended to be exclusive embodiments. It should further be understood that the foregoing and many various modifications, omissions and additions may be devised by one skilled in the art without departing from the spirit and scope of the invention.

What is claimed is:

1. Apparatus for transmission of electrical signals, including both electrical power and communication signals, between plurality of locations in a subterranean well, the apparatus comprising:

a bus supervisor located at one of the plurality of locations;

a node located at each of the remaining locations of the plurality of locations;

a bus interface at the bus supervisor and each node, the interface capable of supporting differential and common mode connection between the bus supervisor and each node, and between the nodes themselves, the interface providing high parallel impedance for differential mode connections and low series impedance for common mode connections; and a bus electrically connecting the bus supervisor and each node via the respective bus interfaces in common mode with an electrical return path to the bus supervisor for transmitting electrical power signals to or between each node location, and in differential mode for two way transmission of communication signals between the bus supervisor and nodes or between the nodes.

2. The apparatus of claim 1 wherein at least one bus interface is coupled to a differential receiver and a coil.

3. The apparatus of claim 1 wherein at least one bus interface is coupled to a differential transmitter and a coil.

4. The apparatus of claim 1 wherein the bus supervisor is located at a surface location.

5. The apparatus of claim 1 wherein the bus supervisor is located at a downhole location.

6. The apparatus of claim 1 wherein the communication signals include control signals.

7. The apparatus of claim 1 wherein the communication signals include data signals.

8. The apparatus of claim 1 wherein at least one bus interface provides galvanic insulative properties.

9. The apparatus of claim 8 wherein the at least one bus interface is a transformer.

10. The apparatus of claim 1 wherein the bus is a cable comprising a pair of electrical conductors.

11. The apparatus of claim 10 wherein the conductor pair is a twisted pair.

12. The apparatus of claim 6 wherein the bus supervisor serves as an extension of an industrial bus.

13. The apparatus of claim 10 wherein the cable further comprises an external armored shell housing the conductor pair.

14. The apparatus of claim 13 wherein the armored shell is conductive.

15. The apparatus of claim 14 wherein the common mode electrical return path is through the armored shell.

16. The apparatus of claim 15 wherein the electrical power is DC current.

17. The apparatus of claim 15 wherein the electrical power is AC current.

18. The apparatus of claim 15 wherein the conductive outer shell has an outer insulative encapsulation.

19. Method for transmission of electrical signals, including both electrical power and communication signals, between plurality of locations in a subterranean well, method comprising the steps of:

locating a bus supervisor at one of the plurality of locations;

locating a node at each of the remaining locations of the plurality of locations;

providing differential and common mode connection between the bus supervisor and each node, and between the nodes themselves via a bus interface at the bus supervisor and at each node, the interface providing high impedance for differential mode connections and low impedance for common mode connections.

electrically connecting the bus supervisor and each node by a bus via the respective bus interfaces in common mode with an electrical return path to the bus supervisor for transmitting electrical power signals to or between each mode location, and in differential mode for two way transmission of communication signals between the bus supervisor and nodes or between the nodes.

20. The method of claim 19 wherein the bus supervisor is located at a downhole location.

21. The method of claim 19 further comprising the step of the providing galvanic insulation between the bus supervisor and nodes via the bus interface.

22. The method of claim 21 wherein the bus interface is a transformer.

23. The method of claim 19 wherein the bus supervisor is located at a surface location.

24. The method of claim 23 wherein the bus supervisor serves as an extension of an industrial bus.

25. The method of claim 19 where the step of electrically connecting the bus supervisor and nodes is performed by providing a cable comprising a pair of electrical conductors.

26. The method of claim 25 wherein the electrical return path for the common mode connection is effected through an external conductive armored shell of the cable, the shell housing the conductor pair.

27. The method of claims 25 wherein the conductor pair is a twisted pair.

* * * * *